US011665176B2

(12) United States Patent
Gaddy et al.

(10) Patent No.: US 11,665,176 B2
(45) Date of Patent: May 30, 2023

(54) SYSTEMS AND METHODS OF PERFORMING AN IDENTITY VERIFICATION ACROSS DIFFERENT GEOGRAPHICAL OR JURISDICTIONAL REGIONS

(71) Applicant: Global Data Consortium, Inc., Raleigh, NC (US)

(72) Inventors: Charles Whitley Gaddy, Raleigh, NC (US); Job Crowder, Raleigh, SC (US)

(73) Assignee: Global Data Consortium, Inc., Raleigh, NC (US)

(*) Notice: Subject to any disclaimer, the term of this patent is extended or adjusted under 35 U.S.C. 154(b) by 81 days.

(21) Appl. No.: 17/322,176

(22) Filed: May 17, 2021

(65) Prior Publication Data
US 2022/0094691 A1 Mar. 24, 2022

Related U.S. Application Data

(60) Provisional application No. 63/025,513, filed on May 15, 2020.

(51) Int. Cl.
*H04L 9/40* (2022.01)
*G06F 21/62* (2013.01)

(52) U.S. Cl.
CPC ........ *H04L 63/107* (2013.01); *G06F 21/6245* (2013.01); *H04L 63/0414* (2013.01); *H04L 63/20* (2013.01)

(58) Field of Classification Search
CPC ... H04L 63/107; H04L 63/0414; H04L 63/20; H04L 63/08; G06F 21/6245; G06F 17/40
(Continued)

(56) References Cited

U.S. PATENT DOCUMENTS 9,288,184 B1 * 3/2016 Kvamme ................ H04L 63/10
9,465,913 B1 10/2016 Chaganti et al.
(Continued)

OTHER PUBLICATIONS

International Search Report and Written Opinion of the International Searching Authority, Appl. No. PCT/US2021/032735 (dated Aug. 18, 2021).
(Continued)

*Primary Examiner* — Kambiz Zand
*Assistant Examiner* — Aubrey H Wyszynski
(74) *Attorney, Agent, or Firm* — Kaufman & Canoles, P.C.

(57) ABSTRACT

Systems and methods of performing identity verification across different geographical or jurisdictional regions are provided. In one exemplary embodiment, a method by a first network node comprises sending, by the first network node located in a first geographical or jurisdictional region, to a second network node located in a second geographical or jurisdictional region, an indication of an identity verification associated with a certain identity based on personally identifiable information of that identity received by the first network node from the second network node. Further, the identity verification is determined based on whether the PII data of the certain identity corresponds to PII data of at least one of a plurality of identities associated with the first region and stored in one or more databases located in the first region and on identity verification rule(s) associated with the first region.

20 Claims, 12 Drawing Sheets

(58) Field of Classification Search
USPC .............................................................. 726/1
See application file for complete search history.

(56) References Cited

U.S. PATENT DOCUMENTS

| | | | |
|---|---|---|---|
| 9,959,397 B1* | 5/2018 | Kvamme | ................ H04L 63/08 |
| 2008/0103799 A1 | 5/2008 | Domenikos et al. | |
| 2011/0204142 A1 | 8/2011 | Rao | |
| 2014/0370959 A1 | 12/2014 | Yacenda | |
| 2019/0073676 A1* | 3/2019 | Wang | .................... H04W 4/029 |
| 2019/0188706 A1* | 6/2019 | McCurtis | ............... G06Q 20/40 |
| 2019/0377901 A1* | 12/2019 | Balzer | ................ H04L 63/0421 |
| 2021/0328973 A1* | 10/2021 | Sarkissian | ........... G06F 21/6245 |

OTHER PUBLICATIONS

Symanovich, "What Is Personally Identifiable Information (PII)?"; Lifelock, Sep. 6, 2017; Retrieved on Jul. 17, 2021 from https://www.lifelock.com/learn-identity-theft-resources-what-is-personally-identifiable-information.html.

Arsanyi et al. "A Multilayered Jurisdictional Patchwork: Immigration Federalism in the United States." Law & Policy, vol. 34, Issue 2, pp. 138-158 (Dec. 22, 2011); retrieved on Jul. 17, 2021 from https://onlinelibrary.wiley.com/doi/abs/10.1111 ⁅.1467-9930.2011.00356.x.

* cited by examiner

400b

- 401b: BY A FIRST NETWORK NODE LOCATED IN A FIRST GEOGRAPHICAL OR JURISDICTIONAL REGION, RECEIVE, FROM AT LEAST ONE FIRST REGION DATABASE, AN INDICATION THAT PII OF A CERTAIN IDENTITY CORRESPONDS TO PII OF AT LEAST ONE OF A PLURALITY OF FIRST REGION IDENTITIES STORED IN THAT DATABASE

- 413b: PERFORM AN IDENTITY VERIFICATION BASED ON AN INDICATION THAT THE PII OF THE CERTAIN IDENTITY CORRESPONDS TO THE PII OF THE AT LEAST ONE OF THE PLURALITY OF FIRST REGION IDENTITIES AND ON ONE OR MORE IDENTITY VERIFICATION RULES ASSOCIATED WITH THE FIRST REGION

- 415b: DETERMINE A RELIABILITY SCORE THAT INDICATES A CONFIDENCE LEVEL THAT THE CURRENT IDENTITY CORRESPONDS TO THE AT LEAST ONE OF THE PLURALITY OF FIRST REGION IDENTITIES BASED ON THE INDICATION THAT THE PII OF THE CERTAIN IDENTITY MATCHES THE PII OF THE AT LEAST ONE OF THE PLURALITY OF FIRST REGION IDENTITIES AND ON THE ONE OR MORE IDENTITY VERIFICATION RULES ASSOCIATED WITH THE FIRST REGION

- 417b: STANDARDIZE THE RELIABILITY SCORE TO OBTAIN A STANDARDIZED RELIABILITY SCORE

- 419b: SEND, TO THE SECOND NETWORK NODE, AN INDICATION OF THE STANDARDIZED RELIABILITY SCORE OR AN INDICATION THAT THE CERTAIN IDENTITY CORRESPONDS TO A FIRST REGION IDENTITY

FIG. 4B

SYSTEMS AND METHODS OF PERFORMING AN IDENTITY VERIFICATION ACROSS DIFFERENT GEOGRAPHICAL OR JURISDICTIONAL REGIONS

CROSS REFERENCE TO RELATED APPLICATIONS

This application claims the benefit of U.S. Prov. App. No. 63/025,513, filed May 15, 2020, which is hereby incorporated by reference as if fully set forth herein.

FIELD OF DISCLOSURE

The present disclosure relates generally to the field of identity verification, and in particular to systems and methods of performing an identity verification across different geographical or jurisdictional regions.

BACKGROUND

With the advent of the General Data Protection Regulation (GDPR) in the European Union (EU) and the European Economic Area (EEA) and other data protection and privacy regulations, personally identifiable information data must remain localized to its country of origin. Under these regulations, PII data can be used for identity verification for financial and compliance use cases around the world so long as the PII data remains localized to its home country of origin.

Prior to these regulations, identity verification systems were designed to centralize PII data in a single data structure usually in a location outside the country where the PII data originated. Today, identity verification systems that centralize PII data outside the country where the PII data originated would violate these regulations.

Accordingly, there is a need for improved techniques for identity verification across different geographical or jurisdictional regions so as to conform to corresponding data protection and privacy regulations. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, embodiments of the present disclosure relate to systems and methods of performing an identity verification across different geographical or jurisdictional regions so as to conform to corresponding data protection and privacy regulations. According to one aspect, a method by a first network node of performing identify verification across different geographical or jurisdictional regions comprises, sending, by the first network node located in a first geographical or jurisdictional region, to a second network node located in a second geographical or jurisdictional region, an indication of an identity verification associated with a certain identity based on PII data of that identity received by the first network node from the second network node. Further, the identity verification indication is non-PII. Also, the identity verification is determined based on the PII data of the certain identity corresponding to PII data of at least one of a plurality of identities associated with the first region and stored in one or more databases located in the first region and on one or more identity verification rules associated with the first region.

According to another aspect, the step of sending the identity verification indication is responsive to receiving, by the first network node, from the second node, an indication of the PII data of the certain identity.

According to another aspect, the method further includes parsing the PII data of the certain identity to obtain modified PII data of the certain identity.

According to another aspect, the method further includes standardizing the PII data of the certain identity to obtain modified PII data of the certain identity.

According to another aspect, the method further includes pre-processing the PII data of the certain identity based on a first region character set to obtain modified PII data of the certain identity.

According to another aspect, the method further includes pre-processing the PII data of the certain identity based on an application programming interface of each database to obtain modified PII data of the certain identity.

According to another aspect, the method further includes sending, by the first network node, to each first region database, the PII data of the certain identity. Further, each first region database is operable to determine that the PII data of the certain identity corresponds to the PII data of the at least one of the plurality of first region identities.

According to another aspect, the method further includes receiving, by the first network node, from at least one first region database, an indication that the PII data of the certain identity corresponds to the PII data of the at least one of the plurality of first region identities.

According to another aspect, the method further includes determining the identity verification based on the indication that the PII data of the certain identity corresponds to the PII data of the at least one of the plurality of first region identities and on the one or more first region identity verification rules.

According to another aspect, the method further includes determining a reliability score that indicates a confidence level that the current identity corresponds to the at least one of the plurality of first region identities based on the indication that the PII data of the certain identity corresponds to the PII data of the at least one of the plurality of first region identities and on the one or more first region identity verification rules. Further, the identity verification indication includes an indication of the reliability score.

According to another aspect, the method further includes standardizing the reliability score.

According to another aspect, the identify verification indication includes an indication that the current identity corresponds to the at least one of the plurality of first region identities.

According to another aspect, the PII data of the current identity includes a name, a business or residential address, a date of birth, a national identification number, or a phone number.

According to another aspect, the first network node includes volatile memory, with the PII data of the certain identity only being stored in the volatile memory while the PII data of the certain identity is resident in the first network node.

According to another aspect, the method further includes sending, by the first network node, to a third network node having at least one of the one more databases, the PII data of the certain identity. Further, each database is operable to determine that the PII data of the certain identity corresponds to the PII data of the at least one of the plurality of first region identities.

According to another aspect, the method further includes receiving, by the first network node, from a third network node having at least one of the one more databases, an indication that the PII data of the certain identity corresponds to the PII data of the at least one of the plurality of first region identities.

According to one aspect, a first network node configured to perform an identity verification across different geographical or jurisdictional regions comprises a processor and a memory. Further, the memory contains instructions executable by the processor whereby the first network node is configured to send, by the first network node located in a first geographical or jurisdictional region, to a second network node located in a second geographical or jurisdictional region, an indication of an identity verification of a certain identity based on PII data of that identity received by the first network node from the second network node. Further, the identity verification indication is non-PII. Also, the identity verification is performed based on the PII data of the certain identity corresponding to PII data of at least one of a plurality of identities associated with the first region and stored in one or more databases located in the first region and on one or more identity verification rules associated with the first region.

According to another aspect, the first network node includes volatile memory and the PII data of the certain identity is only stored in the volatile memory while resident in the first network node.

According to one aspect, a method by a second network node of performing an identity verification across different geographical or jurisdictional regions comprises receiving, by the second network node located in a second geographical or jurisdictional region, from a first network node located in a first geographical or jurisdictional region, an indication of an identity verification of a certain identity based on PII data of that identity sent by the second network node to the first network node. Further, the identity verification indication is non-PII. In addition, the identity verification is performed based on the PII data of the certain identity corresponding to PII data of at least one of a plurality of identities associated with the first region and stored in one or more databases located in the first region and on one or more identity verification rules associated with the first region.

According to one aspect, a second network node configured to perform an identity verification across different geographical or jurisdictional regions comprises a processor and a memory. Further, the memory contains instructions executable by the processor whereby the second network node is configured to receive, by the second network node located in a second geographical or jurisdictional region, from a first network node located in a first geographical or jurisdictional region, an indication of an identity verification associated with a certain identity based on PII data of that identity sent by the second network node to the first network node. The identity verification indication is non-PII. In addition, the identity verification is performed based on the PII data of the certain identity corresponding to PII data of at least one of a plurality of identities associated with the first region and stored in one or more databases located in the first region and on one or more identity verification rules associated with the first region.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIGS. 4A-B illustrate embodiments of a method performed by a first network node of performing an identity verification across different geographical or jurisdictional regions in accordance with various aspects as described herein.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details.

Figure 1:
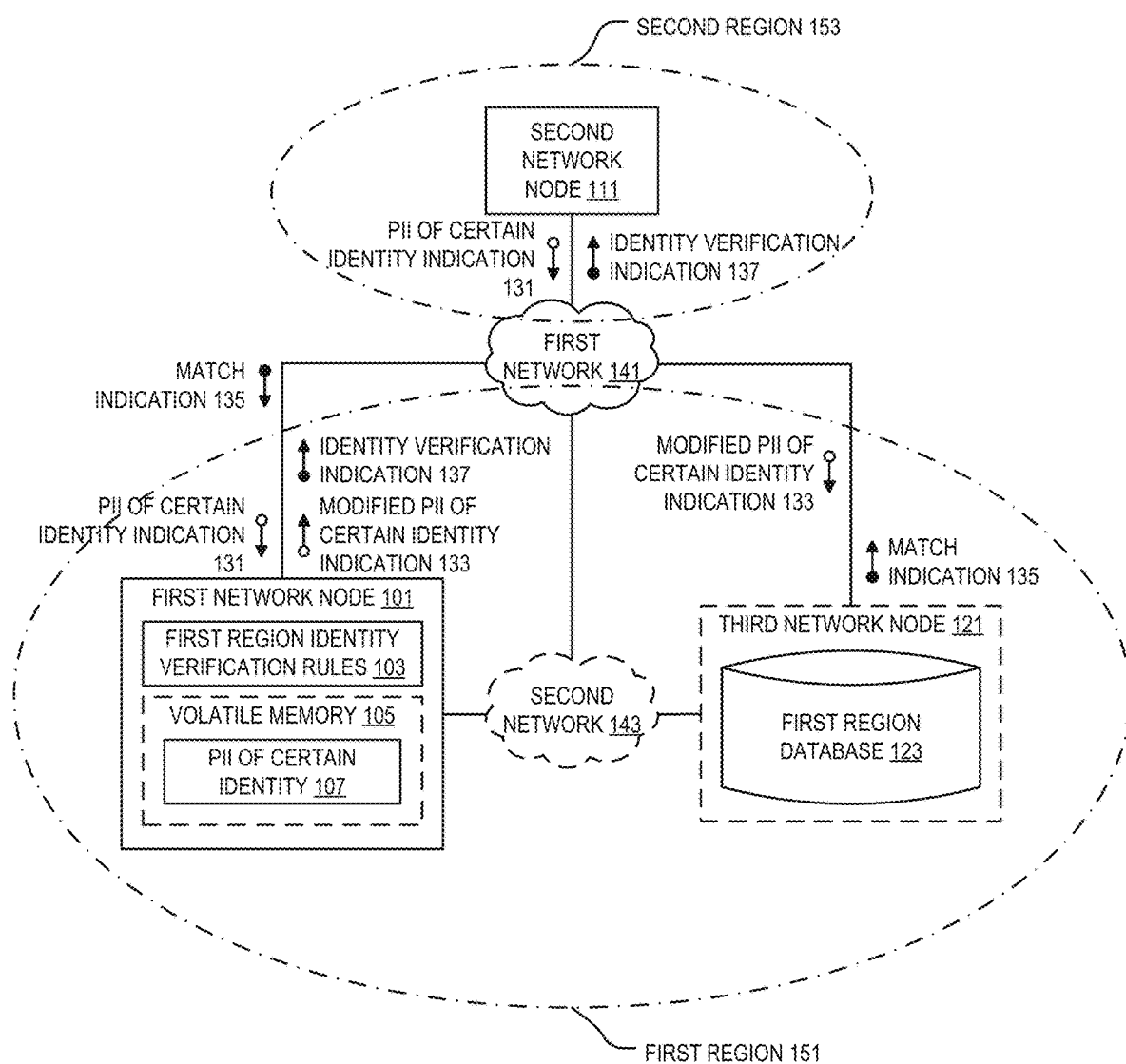
FIG. 1 illustrates one embodiment of a system of performing an identity verification across different geographical or jurisdictional regions in accordance with various aspects as described herein.

In this disclosure, systems and methods of performing an identity verification across different geographical or jurisdictional regions are provided. For example, FIG. 1 illustrates one embodiment of a system 100 in accordance with various aspects as described herein. In FIG. 1, the system 100 includes a first network node 101 (e.g., server) in a first geographical or jurisdictional region 151 (e.g., Germany) that is communicatively coupled via a first network (e.g., Internet) 141 to a second network node 111 (e.g., server) in a second geographical or jurisdictional region 153 (e.g., United States). A geographical region may be a demarcated area of the Earth such as a town, city, county, state, providence, country, continent, or the like. A jurisdictional region may be an area with a set of laws under the control of a system of courts or a government entity. The system 100 also includes a third network node 121 (e.g., server) located in the first region 151 and having one or more databases 123 (e.g., German Credit Bureau) with each having personally identifiable information of a plurality of first region identities (e.g., name, address, country code, date of birth, national identification number, social security number, phone number, email address, or the like).

In operation, the first network node 101 in the first region 151 may receive, from the second network node 111 in the second region 153 PII data of a certain identity 131. The first network node 101 may standardize the PII data of the certain identity 131 according to certain rules of the first region 151 to obtain modified PII data of the certain identity. Further, the first network node 101 may pre-process the PII data of the certain identity 131 based on a character set (e.g., German alphabet) associated with the first region 151 to obtain the modified PII data of the certain identity. The first network node 101 may also parse the PII data of the certain identity 131 to obtain the modified PII data of the certain identity. The first network node 151 may then send, to a third network node 121 (e.g., server) located in the first region 151 and having one or more first region databases 123 (e.g., German Credit Bureau) that includes PII data of a plurality of first region identities, an indication associated with the PII or the modified PII data of the certain entity 133. In response, the first network node 151 receives, from at least one first region database 123 via the third network node 121, an indication that the PII data of the certain identity corresponds to the PII data of the at least one of the plurality of first region identities. The first network node 101 performs the identity verification based on the corresponding PII data of the at least one of the plurality of first region identities and one or more first region identity verification rules 103. The first network node 101 then sends, to the second network node 111, an indication 137 of the identity verification of the certain identity. The identity verification indication is non-personally identifiable information.

In one definition, personally identifiable information is any representation of information that permits the identity of an individual to whom the information applies to be reasonably inferred by either direct or indirect means. PII includes, but is not limited to, a name (e.g., full name, maiden name, mother's maiden name, alias, or the like), a personal identification number (e.g., social security number (SSN), passport number, driver's license number, taxpayer identification number, patient identification number, financial account number, credit card number, or the like), personal address information (e.g., street address, email address, or the like), a personal telephone number, a personal characteristics (e.g., photographic images of face or other identifying characteristics, fingerprints, handwriting, or the like), biometric data (e.g., retina scans, voice signatures, facial geometry, or the like), information identifying personally owned property (e.g., vehicle identification number (VIN), title number, or the like), asset information (e.g., Internet Protocol (IP), Media Access Control (MAC) addresses that consistently link to a particular person, or the like), or the like.

While some of these examples on their own may not constitute PII as more than one person could share these traits, when linked or linkable with other personally identifiable information, a specific individual could be identified. For example, PII such as date of birth, place of birth, business telephone number, business mailing, race, religion, geographical indicators, employment information, medical information, education information, and financial information may not identify an individual on their own. However, when linked to one or more other listed information, the linked information could enable a specific individual to be identified.

In another embodiment, the first network node 151 receives, from at least one first region database 123 via the third network node 121, an indication that the PII data of the at least one of the plurality of first region identities, stored in that first region database, corresponds to the PII data of the certain identity. The first network node 101 performs the identity verification based on the corresponding PII data of the at least one of the plurality of first region identities and the one or more identity verification rules associated with the first region. The first network node 101 then sends, to the second network node 111, an indication 137 associated with the identity verification of the certain identity.

Figure 2:
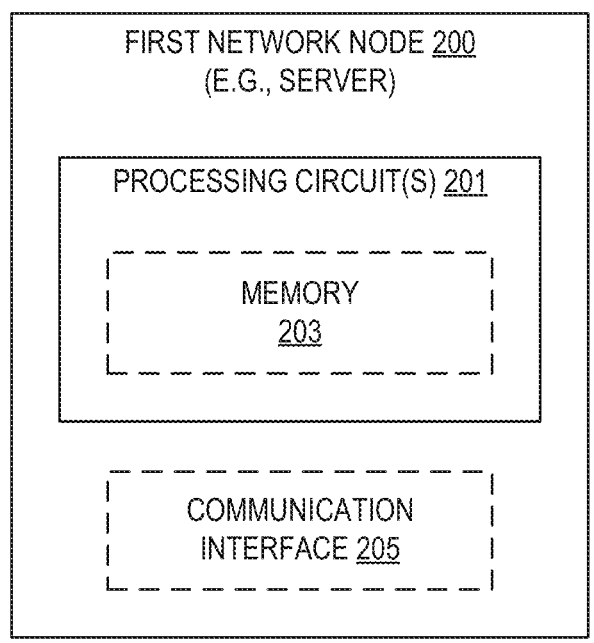
FIG. 2 illustrates one embodiment of a first network node in accordance with various aspects as described herein.

FIG. 2 illustrates one embodiment of a first network node 200 in accordance with various aspects as described herein. As shown, the first network node 200 includes processing circuitry 201 and communication circuitry 205. The communication circuitry 205 is configured to transmit and/or receive information to and/or from one or more other network nodes (e.g., via any communication technology). The processing circuitry 201 is configured to perform processing described above, such as by executing instructions stored in memory 203. The processing circuitry 201 in this regard may implement certain functional means, units, or modules.

Figure 3:
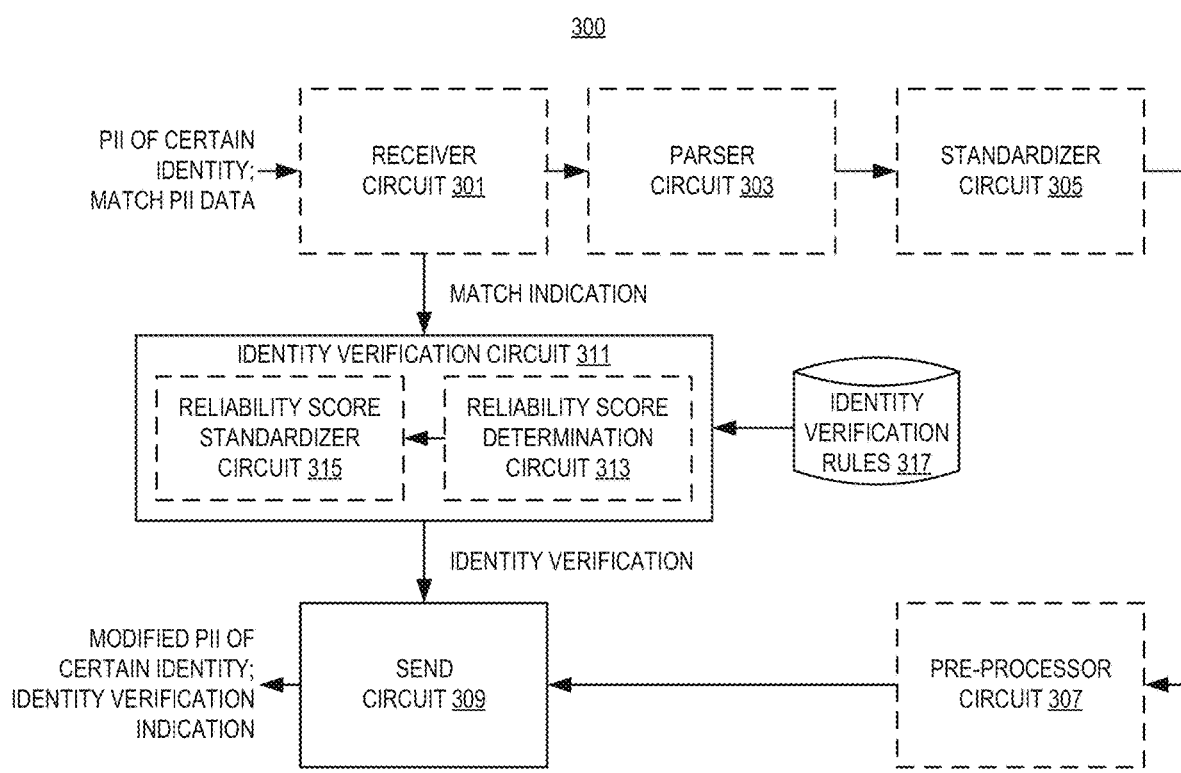
FIG. 3 illustrates another embodiment of a first network node in accordance with various aspects as described herein.

FIG. 3 illustrates another embodiment of a first network node 300 in accordance with various aspects as described herein. As shown, the first network node 300 implements various functional means, units, or modules (e.g., via the processing circuitry 210 in FIG. 2, via software code), or circuits. In one embodiment, these functional means, units, modules, or circuits (e.g., for implementing the method(s) herein) may include for instance: a receiver circuit 301 operable to receive, by the first network node 300 in a first geographical or jurisdictional region, from a second network node in a second geographical or jurisdictional region, PII data of a certain identity; a parser circuit 303 operable to parse the PII data of the certain identity to obtain modified PII data of the certain identity; a standardizer circuit 305 operable to standardize the PII data of the certain identity to obtain modified PII data of the certain identity; and a pre-processor circuit 307 operable to pre-process the PII data of the certain identity based on a character set associated with the first region or an application user interface of a database having a plurality of first region identities to obtain modified PII data of the certain identity.

Further, these functional means, units, modules, or circuits (e.g., for implementing the method(s) herein) may include for instance: a send circuit 309 operable to send, to one or more first region databases, the modified PII data of the certain identifier, with each first region database being operable to determine that the PII data of the certain identity corresponds to PII data of at least one of the plurality of first region identities stored in that database; the receiver circuit 301 further operable to receive, from at least one first region database, an indication that the PII data of the certain identity corresponds to the PII data of the at least one of the plurality of first region identities; an identity verification circuit 311 operable to perform the identity verification based on an indication that the PII data of the certain identity corresponds to the PII data of the at least one of the plurality of first region identities and the one or more first region identity verification rules; and the send circuit 309 further operable to send, to the second network node, an indication of the identity verification of the certain identity.

In another embodiment, these functional means, units, modules, or circuits (e.g., for implementing the method(s) herein) may include for instance: the receiver circuit 301 operable to receive, from at least tone first region database, an indication that the PII data of the certain identity corresponds to the PII data of the at least one of the plurality of first region identities stored in at least one first region database; the identity verification circuit 311 further operable to perform the identity verification based on the corresponding PII data of the at least one of the plurality of first region identities and on the one or more first region identity verification rules; a reliability score determination circuit 313 operable to determine a reliability score that indicates a confidence level that the current identity corresponds to the at least one of the plurality of first region identities based on the indication that the PII data of the certain identity corresponds to the PII data of the at least one of the plurality of first region identities and on the one or more first region identity verification rules; a reliability score standardizer circuit 315 operable to standardize the reliability score to obtain a standardized reliability score; and the send circuit 309 further configured to send, to the second network node, an indication of the standardized reliability score or an indication that the certain identity corresponds to a first region identity in the one or more databases in the first region.

Figure 4A:
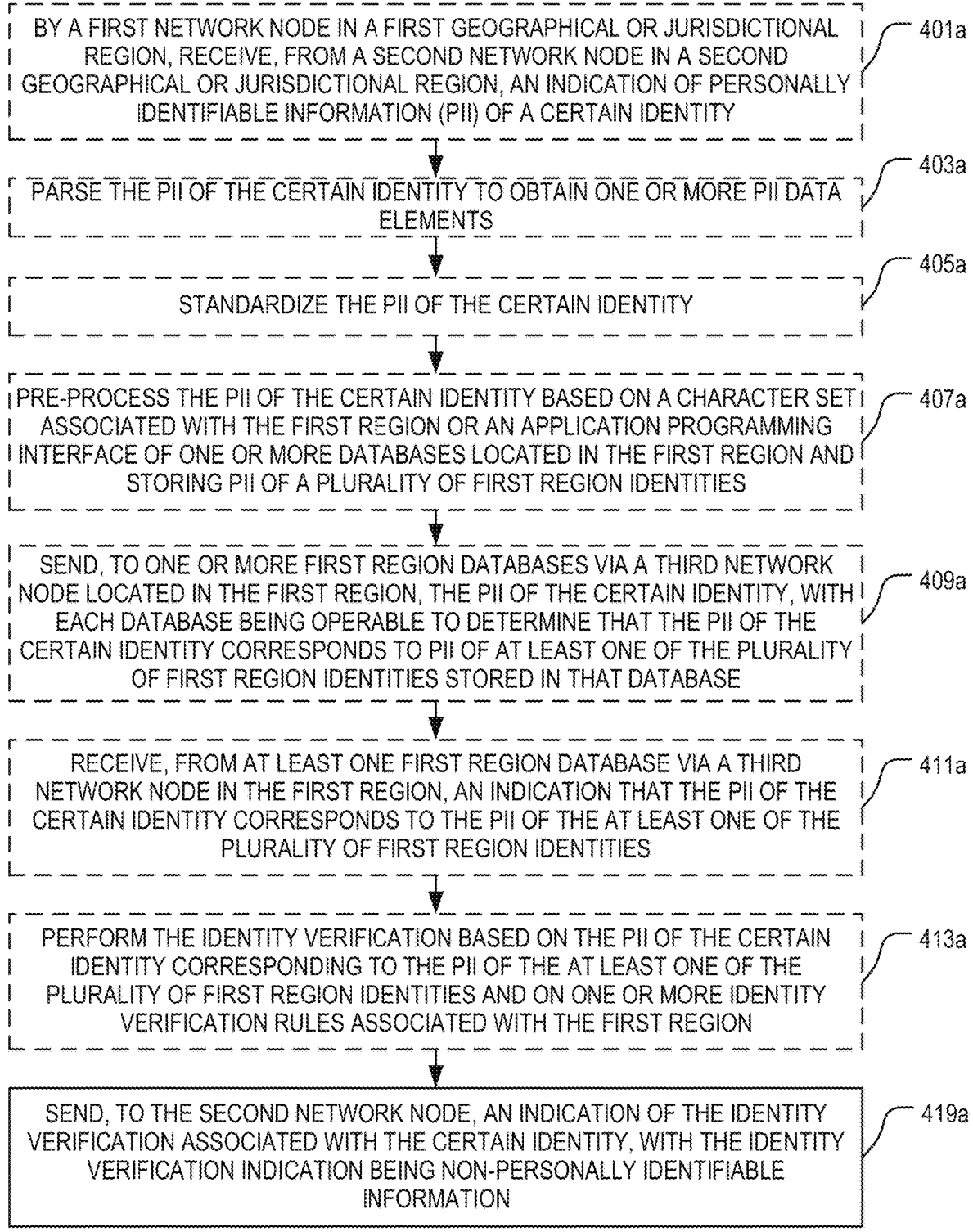

FIGS. 4A-B illustrate embodiments of a method 400a-b performed by a first network node of performing an identity verification across different geographical or jurisdictional regions in accordance with various aspects as described herein. In FIG. 4A, the method 400a may start, for instance, at block 401a, where it may include receiving, by the first network node in a first geographical or jurisdictional region, from a second network node in a second geographical or jurisdictional region, PII data of a certain identity. At block 403a, the method 400a may include parsing the PII data of the certain identity to obtain one or more PII data elements. At block 404a, the method 400a may include standardizing the one or more PII data elements of the certain identity to obtain a modified PII data of the certain identity. At block 407a, the method 400a may include pre-processing the one or more PII data elements of the certain identity based on a character set associated with the first region or an application programming interface of one or more databased located in the first region, to obtain a modified PII data of the certain identity. Each first region database includes a plurality of identities associated with the first region.

In the current embodiment, the method 400a may include sending, to one or more first region databases, the PII data of the certain identity, as represented by block 409a. Further, each first region database is operable to determine that the PII data of the certain identity corresponds to PII data of at least one of the plurality of first region identities stored in that database. At block 411a, the method 400a may include receiving, from at least one first region database, an indication that the PII data of the certain identity corresponds to the PII data of the at least one of the plurality of first region identities. In addition, the method 400a may include determining the identity verification based on an indication that the PII data of the certain identity correspond to the PII data of the at least one of the plurality of first region identities and on one or more first region identity verification rules. At block 415a, the method 400a includes sending, by the first network node, to the second network node, an indication of the identity verification associated with the certain identity.

In FIG. 4B, the method 400b may start, for instance, at block 401b where it may include receiving, by a first network node located in a first geographical or jurisdictional region, from at least one first region database, an indication that PII data of a certain identity corresponds to PII data of at least one of a plurality of first region identities stored in that database. Further, the method 400b may include performing an identity verification based on an indication that the PII data of the certain identity corresponds to the PII data of the at least one of the plurality of first region identities and on one or more identity verification rules associated with the first region, as represented by block 403b. The method 400b may also include determine a reliability score that indicates a confidence level that the current identity corresponds to the at least one of the plurality of first region identities based on the indication that the PII data of the certain identity matches the PII data of the at least one of the plurality of first region identities and on the one or more identity verification rules associated with the first region, as represented by block 405b. At block 407b, the method 400b may include standardizing the reliability score to obtain a standardized reliability score. At block 409b, the method 400b includes sending, by the first network node, to the second network node, an indication of the standardized reliability score or an indication that the certain identity corresponds to a first region identity.

Figure 5:
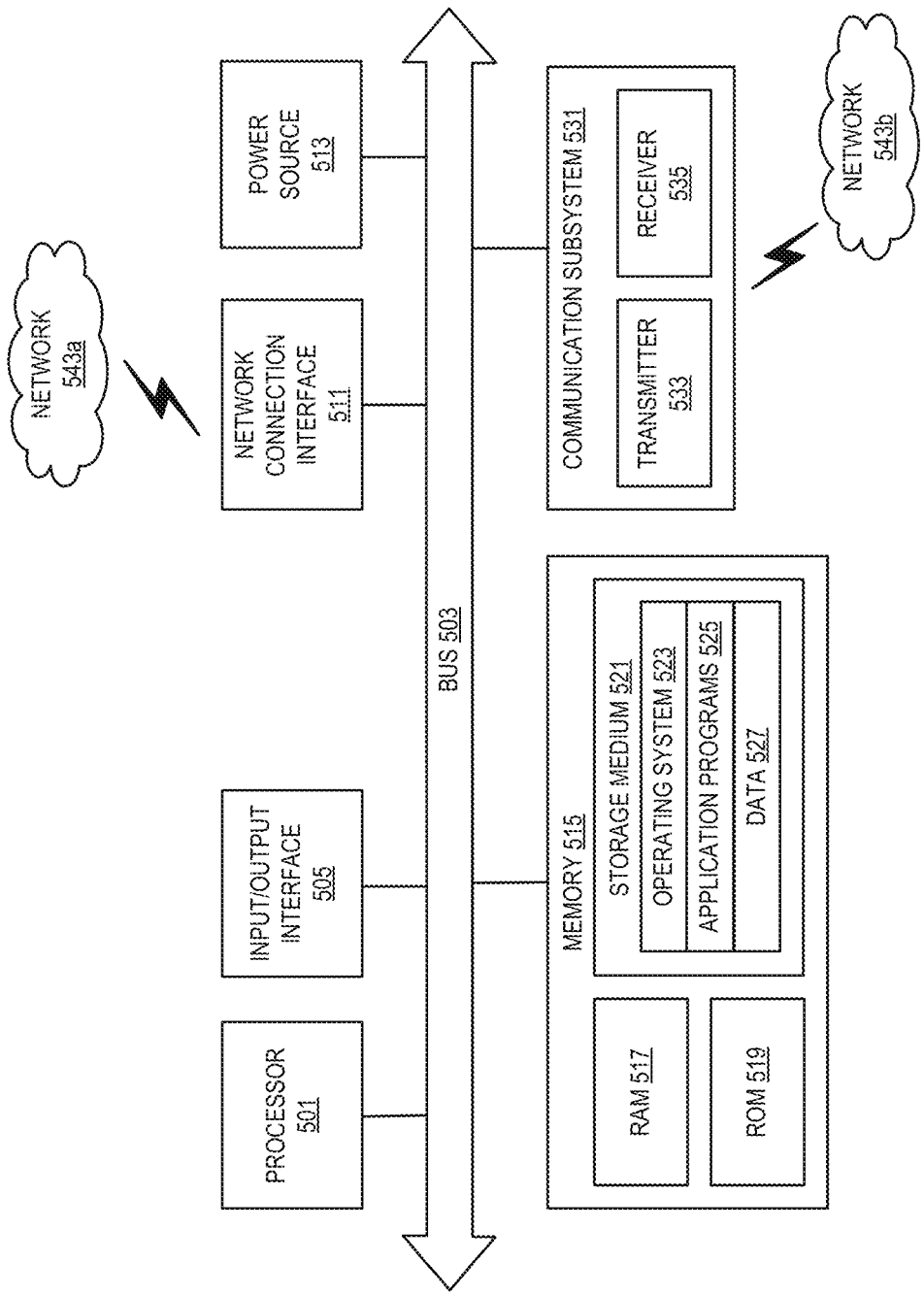
FIG. 5 illustrates one embodiment of a network node in accordance with various aspects as described herein.

FIG. 5 illustrates another embodiment of a network node 500 in accordance with various aspects as described herein. In FIG. 5, network node 500 includes processing circuitry 501 that is operatively coupled to input/output interface 505, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain network nodes may utilize all of the components shown in FIG. 5, or only a subset of the components. The level of integration between the components may vary from one network node to another network node. Further, certain network nodes may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. The network node 500 may be configured to use an output device via input/output interface 505. An output device may use the same type of interface port as an input device. For example, a USB port may be used to provide input to and output from the network node 500. The output device may be a speaker, a sound card, a video card, a display, a monitor, a printer, an actuator, an emitter, a smartcard, another output device, or any combination thereof. The network node 500 may be configured to use an input device via input/output interface 505 to allow a user to capture information into the network node 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, an infrared sensor, a proximity sensor, another like sensor, or any combination thereof. For example, the input device may be an optical sensor and an infrared sensor.

In FIG. 5, network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as a retail item selection program, a widget or gadget engine or another application, and a data file 527. The storage medium 521 may store, for use by the network node 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the network node 500 to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

In FIG. 5, the processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another network node capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the network node 500.

The features, benefits and/or functions described herein may be implemented in one of the components of the network node 500 or partitioned across multiple components of the network node 500. Further, the features, benefits, and/or functions described herein may be implemented in any combination of hardware, software or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Figure 6:
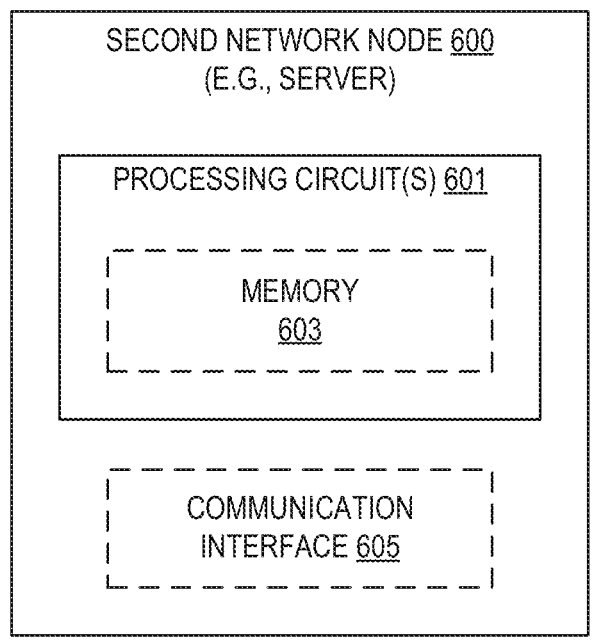
FIG. 6 illustrates one embodiment of a second network node in accordance with various aspects as described herein.

FIG. 6 illustrates one embodiment of a second network node 600 in accordance with various aspects as described herein. As shown, the second network node 600 includes processing circuitry 601 and communication circuitry 605. The communication circuitry 605 is configured to transmit and/or receive information to and/or from one or more other network nodes (e.g., via any communication technology). The processing circuitry 601 is configured to perform processing described above, such as by executing instructions stored in memory 603. The processing circuitry 601 in this regard may implement certain functional means, units, or modules.

Figure 7:
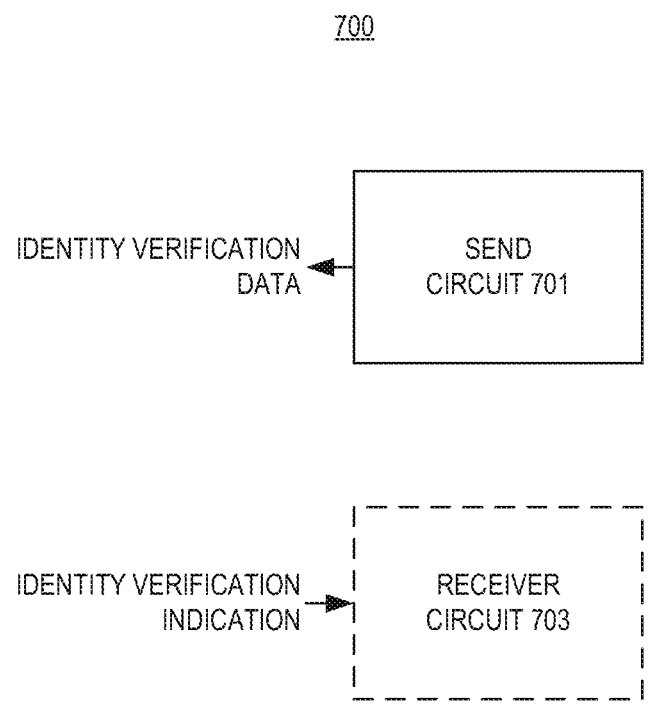
FIG. 7 illustrates another embodiment of a second network node in accordance with various aspects as described herein.

FIG. 7 illustrates another embodiment of a second network node 700 in accordance with various aspects as described herein. As shown, the second network node 700 implements various functional means, units, or modules (e.g., via the processing circuitry 601 in FIG. 6, via software code), or circuits. In one embodiment, these functional means, units, modules, or circuits (e.g., for implementing the method(s) herein) may include for instance: a send circuit 701 operable to send, by the second network node 700 located in a second geographical or jurisdictional region, to a first network node located in a first geographical or jurisdictional region, an indication of PII data of a certain identity; and a receive circuit 703 operable to receive, by the second network node 700, from the first network node, an indication of an identity verification associated with the certain identity based on the received PII data of the certain identity.

Figure 8:
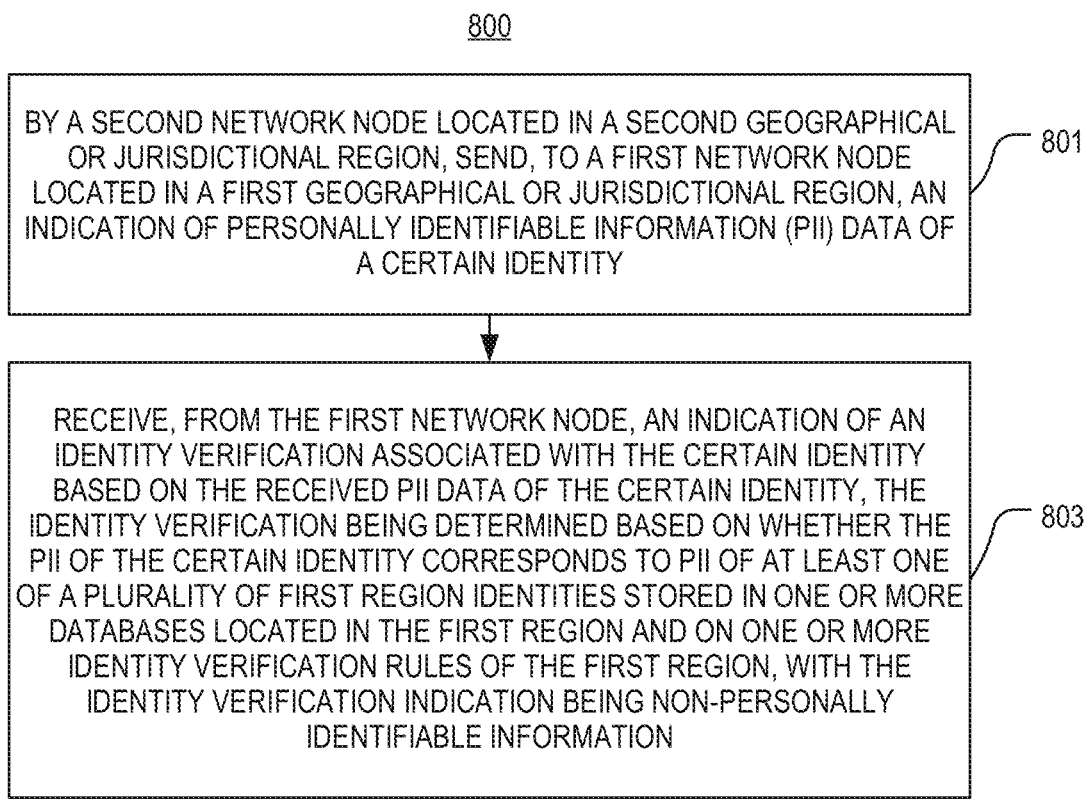
FIG. 8 illustrates one embodiment of a method performed by a second network node of performing an identity verification across different geographical or jurisdictional regions in accordance with various aspects as described herein.

FIG. 8 illustrate embodiments of a method 800 performed by a second network node of performing an identity verification across different geographical or jurisdictional regions in accordance with various aspects as described herein. In FIG. 8, the method 800 may start, for instance, at block 801 where it may include sending, by the second network node located in a second geographical or jurisdictional region, to a first network node located in a first geographical or jurisdictional region, an indication of PII data of a certain identity. Further, the method 800 includes receiving, by the second network node, from the first network node, an indication of an identity verification associated with the certain identity based on the received PII data of the certain identity. The identity verification indication is also non-PII. Further, the identity verification is determined based on whether the PII data of the certain identity corresponds to PII data of at least one of a plurality of first region identities stored in one or more databases located in the first region and on one or more identity verification rules of the first region.

Figure 9A:
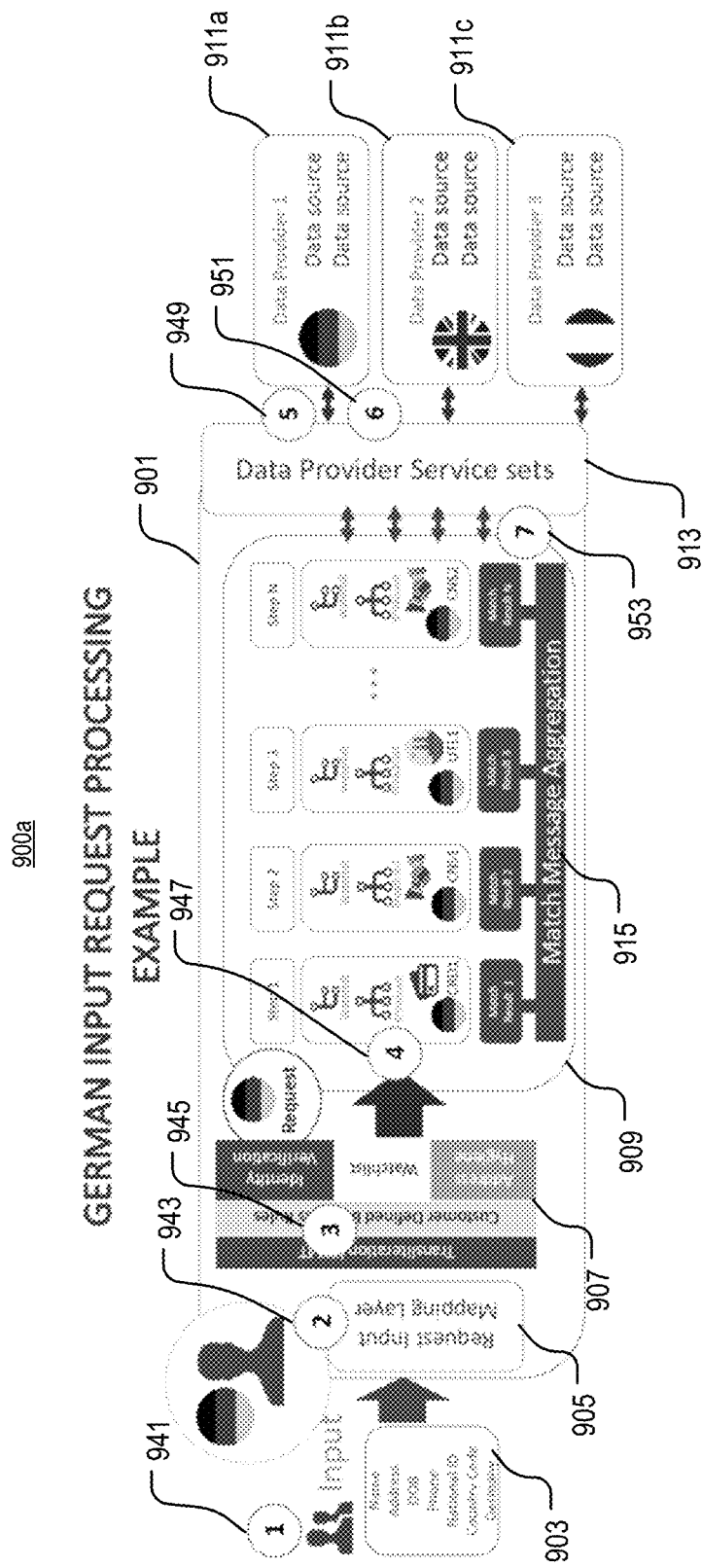
FIGS. 9A-C illustrate another embodiment of a system of performing an identity verification across different geographical or jurisdictional regions in accordance with various aspects as described herein.
Figure 9B:
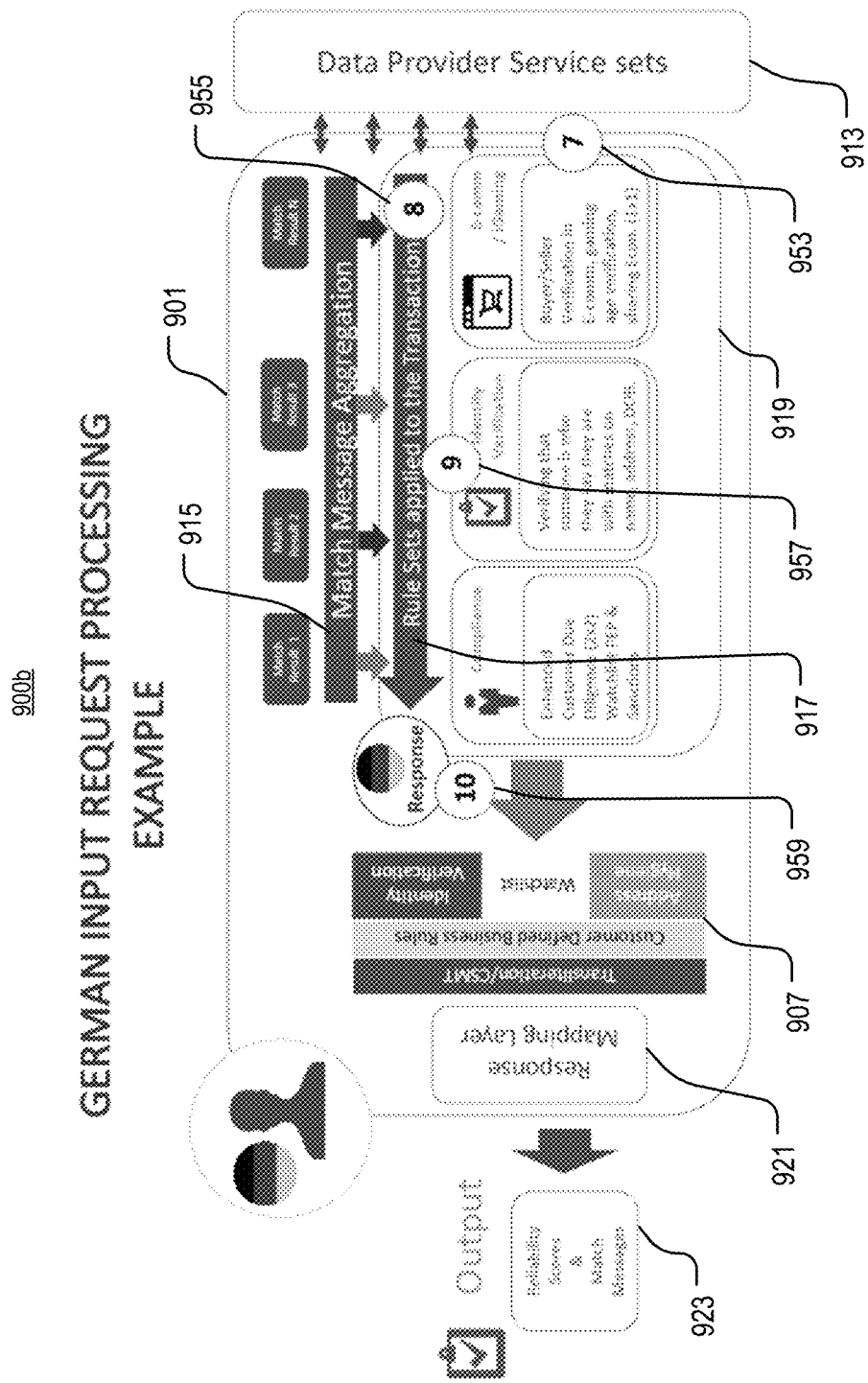
Figure 9C:
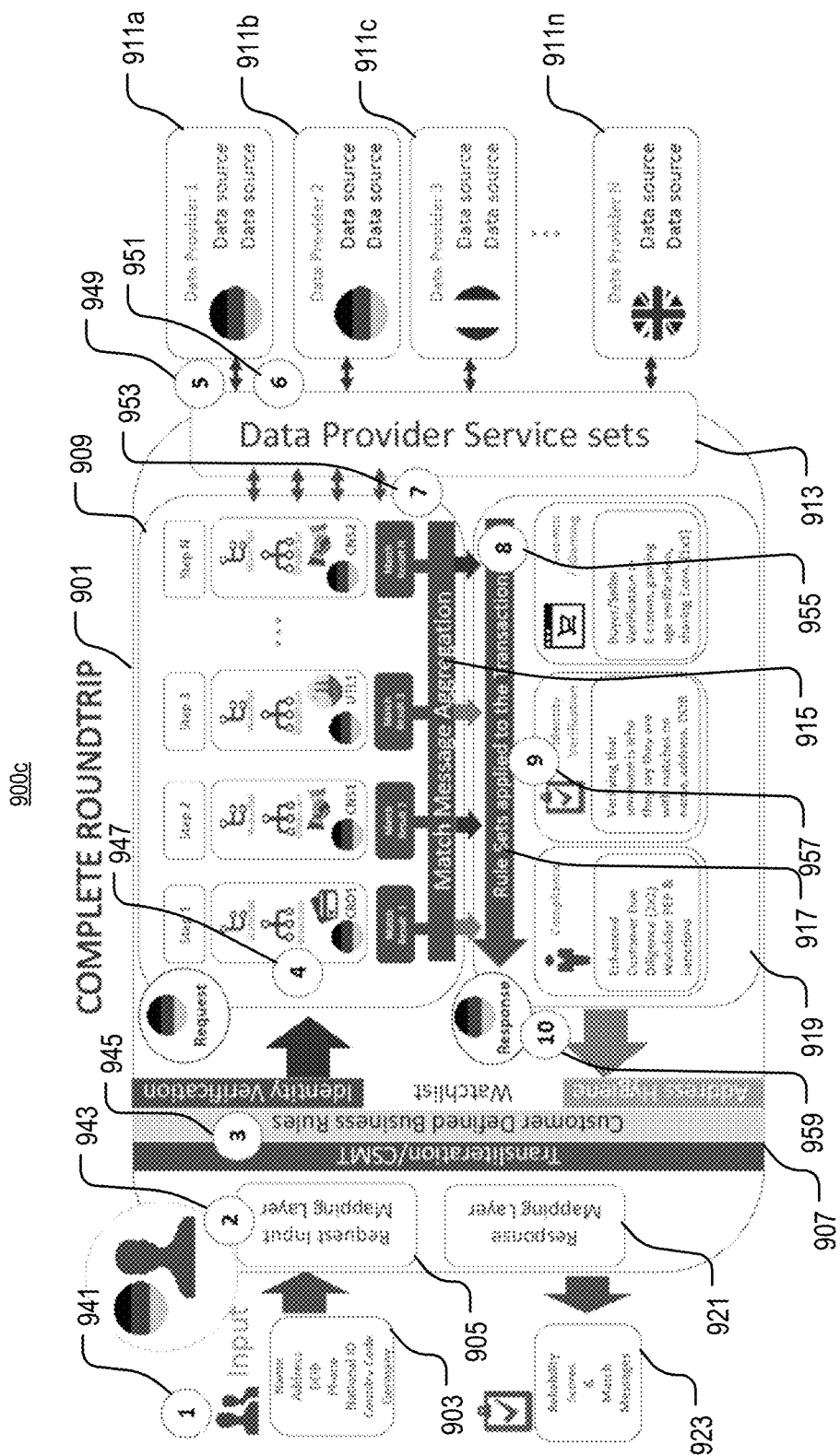

FIGS. 9A-C illustrate another embodiment of a system 900a-c of performing an identity verification across different geographical or jurisdictional regions in accordance with various aspects as described herein. With the advent of GDPR and other privacy regulations, PII data is required to remain localized to its home country. The localized PII data can be used for identity verification such as for financial and compliance use cases around the world. The PII data can remain localized to its home country by connecting, managing, and standardizing inputs/outputs from localized data sources to produce meta-data about an individual's identity without exposing or transferring PII data from a home country. Further, accessing decentralized PII data for identity verification is critical in maintaining privacy while still providing compliant solutions to prevent fraud and money laundering.

The current embodiment does not require that PII data be removed from or shared outside the home country. Instead, the PII data remains in that country and is only accessed in that country based on that country's regulations. Only non-PII data (e.g., metadata, match indication) is shared outside the home country. By doing so allows decentralized access to PII data for identity verification, which is critical in maintaining privacy while still providing compliant solutions to prevent fraud and money laundering. Indeed, solutions that centralize PII data will likely violate regulations and laws governing data privacy and protection in the home country.

In FIG. 9A, the first network node 901 in a first geographical or jurisdictional region (e.g., Germany) receives, from a second network node in a second geographical or jurisdictional region (e.g., France), an indication of PII data (e.g., name, address, date of birth, phone, national identifier, country code) 903 of a certain identity, as referenced by 941. In one example, the indication of the PII data 903 of the certain identity is an application programming interface (API) call that includes the PII data 903 of the certain identity. In response to receiving the indication, the first network node 901 makes a request to its input mapping layer circuit or module 905 to pre-process the PII data 903 of the certain identity, as referenced by 943. Such pre-processing may include parsing the PII data 903 of the certain identity, standardizing the PII data 903 of the certain identity according to certain rules of the first region, the like, or any combination thereof. In one example, the PII data 903 of the certain identity includes a name, an address, a date of birth, a phone, a national identifier, a country code, all of which are parsed and standardized.

In the current embodiment, the first network node 901 makes a request to a pre/post-processor circuit or module 907 to perform additional pre-processing steps on the PII data 903 of the certain identity such as performing a character set mapping transformation (CSMT) based on the country code of the first region and applying customer-defined business rules based on the country code of the first region to the PII data 903 of the certain identity, as referenced by 945. Further, the first network node 901 makes a request to an input data processor circuit or module 909 to apply waterfall or broadcast flows to process the PII data 903 of the certain identity, as referenced by 947. As shown, each step is utilized and interrelated in the processing of a single transaction or identity validation request by the first network node 901. Further, each step can be performed in a "waterfall" mode with a first PII data (e.g., name) falling (e.g., sequentially processed) to a second PII data (e.g., address) or in a "broadcast" mode with the first and second PII data (e.g., name and address) being collectively processed in parallel. The application of the "waterfall" and "broadcast" capabilities enables PII data elements to be mixed, matched and reassembled based on any number of use cases. PII data elements can "waterfall" between each other for matching purposes and then can be "broadcast" to multiples simultaneously across the data network before returning to a next step in the "waterfall". This functionality can be controlled and configured using the results of the metadata and scoring provided by each source.

In FIG. 9A, the first network node 901 is communicatively coupled to a plurality of third network nodes 911a-n located in different geographical or jurisdictional regions. Further, each network node 911a-n has one or more databases storing a plurality of identities associated with that region. As illustrated in FIGS. 9A-C, a database is also referred to as a data source. As referenced by 949, the first network node 901 sends a request to a database processor circuit or module 913 to localize the PII data 903 of the certain identity to the first region databases (e.g., data source). As such, the database processor circuit or module 913 sends, to the third network node 911a (e.g., server, data provider) located in the first region and having one or more first region databases (e.g., German Credit Bureau) that includes PII data of a plurality of identities, an indication associated with the PII data 903 of the certain entity. In response, the third network node 911a compares the PII data 903 with the PII data of the plurality of identities stored in each corresponding first region database to determine any match results. As referenced by 951, the database processor circuit or module 913 of the first network node 901 receives, from the third network node 911a, an indication that the PII data 903 of the certain identity corresponds to or matches PII data of at least one identity stored in the corresponding databases of the third network node 911a. As referenced by 953, the first network node 901 sends a request to the match message aggregation circuit or module 915 to aggregate the match indications to determine metadata, a verification score and a match code for each first region database.

In FIG. 9B, as referenced by 955, the first network node 901 sends a request to a rule sets application circuit or module 917 to receive, from the match message aggregation circuit or module 915, the metadata and the verification score for each first region database. The rule sets application circuit or module 917 then standardizes the metadata, verification scores and match codes. The first network node 901 sends a request to an identity verification circuit or module 919 to apply compliance and identity verification based on the use case (e.g., e-commerce, sharing economy, gaming). The identity verification circuit or module 919 performs the identity verification on the standardized metadata, verification scores and match codes based on the use case (e.g., e-commerce, sharing economy, gaming). The first network node 901 sends a request to the pre/post-processor circuit or module 907 to perform post-processing steps on the standardized metadata, verification scores and/or match codes such as performing a CSMT function based on the country code of the first region and/or applying customer-defined business rules based on the country code of the first region, as referenced by 959.

In another embodiment, an API utilizes metadata and scoring from each individual data source coupled to the data network while the data remains local and in-country. The in-country data is used to conduct a field-by-field assessment of the match type. Each input element (e.g., first name, last name, address, zip, date of birth, phone, social security number) is compared and matched against each data type's registry record so that the API can return a measure of the reliability as to if this person is "who they say they are" in an online transaction. A data registry can include different data types such as credit, utility, consumer, commercial, telco or postal data types. The determination of whether someone "is who they say they are" is assessed by utilizing multiples of different data types, across different countries, and translated into different languages. For instance, the determination of whether someone "is who they say they are" is assessed by utilizing multiples of the above-identified six data types, across fifty-eight countries, and translated into eight languages. Further, the identity verification indication by be a "stop light" indicator returned by the API, with the "stop light" indicator indicating a match, a partial match or no match of an identity (e.g., person). The logic involved is based on element-by-element fuzzy, partial and exact matching algorithms applied to each input PII data element and each PII data element from each localized data source(s).

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (email) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:
by a first network node located in a first geographical or jurisdictional region and communicatively coupled to a second network node located in a second geographical or jurisdictional region, with the second network node being operable to request an identity verification of a certain identity in the first region, the first network node also being communicatively coupled to one or more databases located in the first region with each first region database having identities associated with the first region and each identity having corresponding personally identifiable information (PII) data, each first region database being operable to determine whether the PII data of the certain identity corresponds to the PII data of any first region identities stored in that database, obtaining, from each first region database, the PII data of at least one first region identity that corresponds to the PII data of the certain identity; and sending, by the first network node located in the first region, to the second network node located in the second region, an indication associated with a confidence level of the requested identity verification of the certain identity based on the obtained PII data of the at least one first region identity and one or more identity verification rules associated with the first region.

2. The method of claim 1, wherein said sending is responsive to receiving, by the first network node, from the second node, an indication of the PII data of the certain identity.

3. The method of claim 1, further comprising:
parsing the PII data of the certain identity to obtain one or more PII data elements.

4. The method of claim 3, further comprising:
standardizing at least one PII data element of the certain identity to obtain modified PII data of the certain identity.

5. The method of claim 3, further comprising:
pre-processing at least one PII data element of the certain identity based on a first region character set to obtain modified PII data of the certain identity.

6. The method of claim 3, further comprising:
pre-processing at least one PII data element of the certain identity based on an application programming interface of each first region database to obtain modified PII data of the certain identity.

7. The method of claim 1, further comprising:
sending, by the first network node, to each first region database, an indication that includes a request to query the PII data of the certain identity.

8. The method of claim 7, further comprising:
receiving, by the first network node, from at least one first region database, an indication that the PII data of the certain identity corresponds to the PII data of the at least one first region identity.

9. The method of claim 8, further comprising:
performing the identity verification based on the indication that the PII data of the certain identity corresponds to the PII data of the at least one of the plurality of first region identities and on the one or more first region identity verification rules.

10. The method of claim 9, further comprising:
determining a reliability score that indicates a confidence level that the current identity corresponds to the at least one of the plurality of first region identities based on the indication that the PII data of the certain identity corresponds to the PII data of the at least one of the plurality of first region identities and on the one or more first region identity verification rules, with the identity verification indication including an indication of the reliability score.

11. The method of claim 10, further comprising: standardizing the reliability score to obtain a standardized reliability score.

12. The method of claim 1, wherein the identify verification indication includes an indication that the current identity corresponds to the at least one of the plurality of first region identities.

13. The method of claim 1, wherein the PII data of the current identity includes at least one of a name, a business or residential address, a date of birth, a national identification number, and a phone number.

14. The method of claim 1, wherein the first network node includes volatile memory, with the PII data of the certain identity only being stored in the volatile memory while resident in the first network node.

15. The method of claim 1, further comprising:
sending, by the first network node, to a third network node located in the first region and having at least one of the one more first region databases, an indication associated with the PII data of the certain identity, with each first region database being operable to determine that the PII data of the certain identity corresponds to the PII data of the at least one of the plurality of first region identities.

16. The method of claim 15, further comprising:
receiving, by the first network node, from the third network node, an indication that the PII data of the certain identity corresponds to the PII data of the at least one of the plurality of first region identities.

17. A first network node, comprising:
wherein the first network node is located in a first geographical or jurisdictional region and communicatively coupled to a second network node located in a second geographical or jurisdictional region, with the second network node being operable to request an identity verification of a certain identity in the first region, the first network node also being communicatively coupled to one or more databases located in the first region with each first region database having identities associated with the first region and each identity having corresponding personally identifiable information (PII) data, each first region database being operable to determine whether the PII data of the certain identity corresponds to the PII data of any first region identities stored in that database; and
a processor and a memory, the memory containing instructions executable by the processor whereby the first network node is configured to:
obtain, from each first region database, the PII data of at least one first region identity that corresponds to the PII data of the certain identity; and
send, by the first network node located in the first region, to the second network node located in the second region, an indication associated with a confidence level of the requested identity verification of the certain identity based on the obtained PII data of the at least one first region identity and one or more identity verification rules associated with the first region.

18. The first network node of claim 17, wherein the first network node includes volatile memory and the PII data of the certain identity is only stored in the volatile memory while resident in the first network node.

19. A method by a second network node of performing an identity verification across different geographical or jurisdictional regions, comprising:
receiving, by the second network node located in a second geographical or jurisdictional region, from a first network node located in a first geographical or jurisdictional region, an indication of an identity verification associated with a certain identity based on personally identifiable information (PII) of the certain identity sent by the second network node to the first network node, with the identity verification indication being non-PII and the identity verification being performed based on whether the PII data of the certain identity corresponds to PII data of at least one of a plurality of identities associated with the first region and stored in one or more databases located in the first region and on one or more identity verification rules associated with the first region.

20. A second network node configured to perform an identity verification across different geographical or jurisdictional regions, comprising:
a processor and a memory, the memory containing instructions executable by the processor whereby the second network node is configured to:
receive, by the second network node located in a second geographical or jurisdictional region, from a first network node located in a first geographical or jurisdictional region, an indication of an identity verification associated with a certain identity based on personally identifiable information (PII) of that identity being sent by the second network node to the first network node, with the identity verification indication being non-PII and the identity verification being performed based on whether the PII data of the certain identity corresponds to PII data of at least one of a plurality of identities associated with the first region and stored in one or more databases located in the first region and on one or more identity verification rules associated with the first region.

* * * * *